US010488873B2

(12) United States Patent
Delano et al.

(10) Patent No.: US 10,488,873 B2
(45) Date of Patent: *Nov. 26, 2019

(54) MONITORING SURFACE TEMPERATURE OF DEVICES

(71) Applicant: Microsoft Technology Licensing, LLC, Redmond, WA (US)

(72) Inventors: Andrew Douglas Delano, Woodinville, WA (US); Timothy Jakoboski, Woodinville, WA (US); Ying Huang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/483,656

(22) Filed: Apr. 10, 2017

(65) Prior Publication Data

US 2017/0212537 A1   Jul. 27, 2017

Related U.S. Application Data

(63) Continuation of application No. 14/033,504, filed on Sep. 22, 2013, now Pat. No. 9,618,945.

(51) Int. Cl.
*G06F 19/00* (2018.01)
*G05D 23/19* (2006.01)
(Continued)

(52) U.S. Cl.
CPC ........ *G05D 23/1917* (2013.01); *G01J 5/0003* (2013.01); *G01K 1/143* (2013.01);
(Continued)

(58) Field of Classification Search
CPC ... G05D 23/1917; G05D 23/19; G01J 5/0003; G01K 3/005; G01K 7/427; G01K 1/143
See application file for complete search history.

(56) References Cited

U.S. PATENT DOCUMENTS 6,172,611 B1   1/2001  Hussain et al.
9,618,945 B2 *  4/2017  Delano ................. G05D 23/19
(Continued)

FOREIGN PATENT DOCUMENTS

CN    103226731    7/2013
CN    105190270    12/2015
(Continued)

OTHER PUBLICATIONS

"Case Temperature versus Ambient Temperature", http://www.digikey.com/us/en/techzone/lighting/resources/articles/case-temperature-versus-ambient-temperature.html, Jun. 1, 2012, 2 pages.
(Continued)

*Primary Examiner* — Michael D Masinick
(74) *Attorney, Agent, or Firm* — Rainier Patents, P.S.

(57) ABSTRACT

Techniques for monitoring surface temperature of devices are described. Generally, surface temperature of devices is monitored and controlled to prevent user discomfort and/or injury that may result from user contact with an excessively heated surface. In at least some embodiments, temperature of an external surface of the device is indirectly monitored. For instance, a temperature sensor is positioned at an internal location in a device that has a known temperature relationship to a temperature of an external surface of the device. Alternatively or additionally, a temperature of an external surface of a device may be directly detected. In at least some embodiments, when a temperature of an external surface of a device is determined to reach or exceed a threshold temperature, procedures can be implemented to reduce the temperature of the external surface and/or prevent further heating of the external surface.

20 Claims, 9 Drawing Sheets

(51) Int. Cl.
  *G01K 1/14* (2006.01)
  *G01K 7/42* (2006.01)
  *G01J 5/00* (2006.01)
  *G01K 3/00* (2006.01)

(52) U.S. Cl.
  CPC ............ *G01K 3/005* (2013.01); *G01K 7/427* (2013.01); *G05D 23/19* (2013.01)

(56) References Cited

U.S. PATENT DOCUMENTS

| | | |
|---|---|---|
| 2006/0221568 A1 | 10/2006 | Kardach et al. |
| 2007/0296408 A1 | 12/2007 | Liao et al. |
| 2008/0112463 A1* | 5/2008 | Rotem .................. G01K 1/026 374/183 |
| 2011/0121939 A1 | 5/2011 | Hosomi |
| 2011/0273378 A1 | 11/2011 | Alameh et al. |
| 2012/0166839 A1 | 6/2012 | Sodhi et al. |
| 2013/0063889 A1 | 3/2013 | Yee et al. |
| 2013/0090888 A1 | 4/2013 | Anderson et al. |
| 2013/0091348 A1 | 4/2013 | Kwon et al. |
| 2013/0120630 A1 | 5/2013 | Kim et al. |
| 2013/0166093 A1 | 6/2013 | Kim et al. |
| 2014/0268564 A1 | 9/2014 | Sagneri et al. |
| 2015/0088333 A1 | 3/2015 | Delano et al. |
| 2016/0003688 A1 | 1/2016 | Luber |

FOREIGN PATENT DOCUMENTS

| | | |
|---|---|---|
| CN | 105493645 | 4/2016 |
| TW | 200746983 A | 12/2007 |
| TW | 201317737 A | 5/2013 |

OTHER PUBLICATIONS

"Final Office Action", U.S. Appl. No. 14/033,504, dated Aug. 16, 2016, 11 pages.
"International Preliminary Report on Patentability", Application No. PCT/US2014/056421, dated Oct. 21, 2015, 6 pages.
"International Search Report and Written Opinion", Application No. PCT/US2014/056421, dated Feb. 26, 2015, 8 Pages.
"Non-Final Office Action", U.S. Appl. No. 14/033,504, dated Apr. 22, 2016, 7 pages.
"Notice of Allowance", U.S. Appl. No. 14/033,504, dated Dec. 1, 2016, 5 pages.
"Second Written Opinion", Application No. PCT/US2014/056421, dated Jul. 24, 2015, 5 Pages.
"Foreign Office Action", CN Application No. 201480052082.2, dated Jun. 2, 2017, 14 pages.
"Office Action and Search Report Issued in Taiwan Patent Application No. 103128837", dated Nov. 21, 2017, 15 Pages.
"Second Office Action Issued in Chinese Patent Application No. 201480052082.2", dated Dec. 20, 2017, 7 Pages.

* cited by examiner

MONITORING SURFACE TEMPERATURE OF DEVICES

RELATED APPLICATION

This application is a continuation of and claims priority to U.S. patent application Ser. No. 14/033,504, filed Sep. 22, 2013, entitled "Monitoring Surface Temperature of Devices", the entire disclosure of which is hereby incorporated by reference herein in its entirety.

BACKGROUND

Today's mobile devices provide users with a tremendous amount of portable functionality. For instance, smartphones, tablets, laptops, and so on, enable users to perform a variety of different tasks without being tied to a particular location. While providing such functionality in a mobile form factor provides a great deal of convenience, it also presents many challenges from a device design perspective. For instance, due to their compact sizes, managing operating temperatures in mobile devices is considerably more challenging than in the traditional stationary device scenario.

While designers have found ways of managing temperature inside of mobile devices to protect their hardware components, a mobile device typically does not monitor its external surface temperature. Since most mobile devices are designed to be utilized in direct physical contact with a user, such as a handheld device and/or a laptop device, the external temperature of a mobile device is an important consideration. If an external surface of a mobile device becomes too hot, for example, a user may experience serious discomfort or injury.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for monitoring surface temperature of devices are described. Generally, surface temperature of devices is monitored and controlled to prevent user discomfort and/or injury that may result from user contact with an excessively heated surface. In at least some embodiments, temperature of an external surface of the device is indirectly monitored. For instance, a temperature sensor is positioned at an internal location in a device that has a known temperature relationship to a temperature of an external surface of the device. Alternatively or additionally, a temperature of an external surface of a device may be directly detected.

In at least some embodiments, when a temperature of an external surface of a device is determined to reach or exceed a threshold temperature, procedures can be implemented to reduce the temperature of the external surface and/or prevent further heating of the external surface. The threshold temperature, for example, may be specified as a temperature that is below a temperature known to cause discomfort and/or injury to a user. Thus, embodiments may be employed to prevent an external surface of a device from reaching a temperature that may cause serious discomfort and/or injury to a user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for monitoring surface temperature of devices are described. Generally, surface temperature of devices is monitored and controlled to prevent user discomfort and/or injury that may result from user contact with an excessively heated surface.

In at least some embodiments, temperature of an external surface of the device is indirectly monitored. For instance, a temperature sensor is positioned at an internal location in a device that has a known temperature relationship to a temperature of an external surface of the device. Thus, a temperature of the external surface of the device may be inferred from the temperature at the internal location based on this relationship. The internal location, for example, may be a region on a motherboard or other internal component of the device.

Alternatively or additionally, a temperature of an external surface of a device may be directly detected. For instance, a temperature sensor can be attached to an internal surface that is adjacent to an external surface of a device. A temperature sensor may also be positioned internally to a device to detect heat radiated from an external surface of the device. For instance, an infrared (IR) sensor positioned internally to a device may be positioned to detect a temperature of an external surface of the device.

In at least some embodiments, when a temperature of an external surface of a device is determined to reach or exceed a threshold temperature, procedures can be implemented to reduce the temperature of the external surface and/or prevent further heating of the external surface. The threshold temperature, for example, may be specified as a temperature that is below a temperature known to cause discomfort and/or injury to a user. Thus, embodiments may be employed to prevent an external surface of a device from reaching a temperature that may cause serious discomfort and/or injury to a user.

In the following discussion, an example environment is first described that is operable to employ techniques described herein. Next, a section entitled "Remote Temperature Sensing" describes some example ways for detecting temperature of an external surface of a device from a remote location of the device in accordance with one or more embodiments. Following this, a section entitled "Direct Temperature Sensing" discusses some example ways for directly detecting temperature of an external surface of a device in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
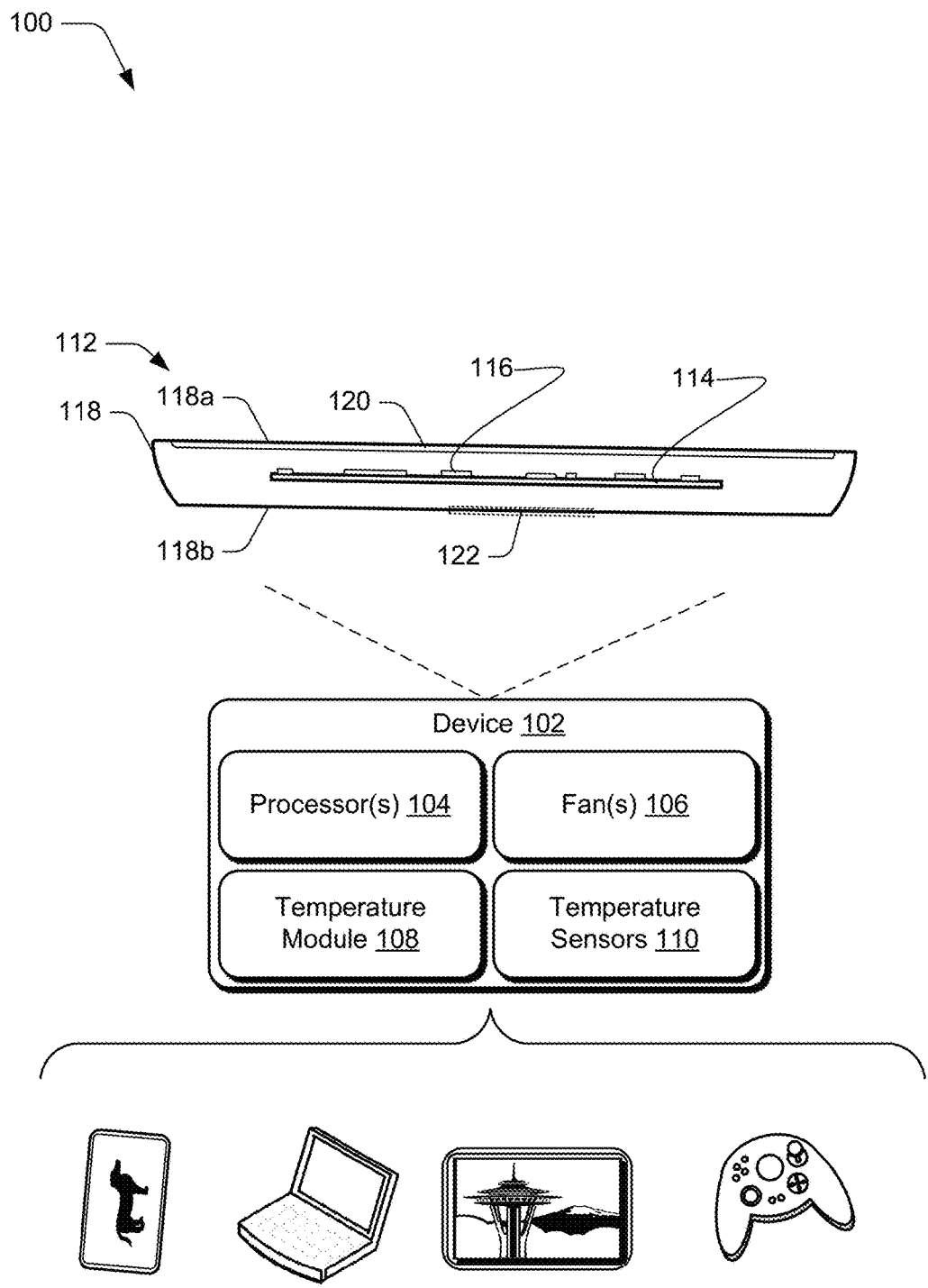
FIG. 1 is an illustration of an environment in an example implementation that is operable to employ techniques discussed herein.

FIG. 1 is an illustration of an environment 100 in an example implementation that is operable to employ techniques for monitoring surface temperature of devices described herein. The environment 100 includes a device 102, which is representative of an end-user computing device. The device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The device 102 includes one or more processors 104, which are representative of functionality to perform various data processing tasks for the device 102. Further details and implementations of the processors 104 are discussed below with reference to the system 900 of FIG. 9.

The device 102 further includes one or more fans 106 and a temperature module 108. The fans 106 are representative of different mechanisms for generating air flow within and/or around the device 102. The fans 106, for example, can be leveraged to reduce and/or control temperature of various portions of the device 102 by redistributing and/or removing heat from the device 102. While embodiments are discussed herein with reference to utilizing fans to control temperature of the device 102, it is to be appreciated that embodiments may employ a variety of different techniques and mechanisms for reducing heat. Examples of other mechanisms include liquid cooling, thermoelectric cooling, piezoelectric pumps, and so forth.

The temperature module 108 is representative of functionality to control various temperature-related aspects of the device 102. The temperature module 108, for example, is communicably connected to temperature sensors 110 of the device 102, which enables the temperature module 108 to monitor temperature at various portions of the device 102. The temperature sensors 110 are representative of different types of sensors that detect temperature at various regions of the device 102. The temperature sensors 110 may be configured in a variety of different ways, such as an integrated circuit (IC) temperature sensor, a resistance temperature detector (RTD), a thermocouple, an infrared (IR) sensor, and so forth. Further, the temperature sensors 110 may be implemented as digital and/or analog sensors.

A cutaway side view 112 of the device 102 is illustrated, which includes a side view of a printed circuit (PC) board 114 of the device 102. The PC board 114 has mounted thereon different components of the device 102. The processor 104, for instance, is mounted on the PC board 114, as well as various other components. One or more of the temperature sensors 110 are also mounted on the PC board 114, such as to monitor temperature for different components and/or at different regions of the PC board 114. In at least some embodiments, the PC board 114 represents a motherboard of the device 102.

Mounted on the PC board 114 is a touch temperature sensor 116, which is representative of a temperature sensor configured to track temperature of an external surface 118 of a chassis of the device 102. The external surface 118 generally represents a portion of a chassis of the device 102 that a user comes in physical contact with while using the device 102. The external surface 118, for instance, includes a front surface 118a and a rear surface 118b. The front surface 118a includes a display 120 which is configured to output graphics for the device 102.

According to various embodiments, the touch temperature sensor 116 is positioned on the PC board 114 such that there is a known correlation between the temperature detected by the touch temperature sensor 116 and the actual surface temperature of the external surface 118. Thus, utilizing this known correlation, the temperature of the external surface 118 can be monitored and controlled by the temperature module 108 based on temperature detected by the touch temperature sensor 116.

For instance, consider that the rear surface 118b has a known hotspot 122. The hotspot 122, for instance, corresponds to a localized region of the external surface 118 that is typically hotter than other portions of the external surface 118 while the device 102 is in operation. For example, the hotspot 122 is positioned near heat-producing components of the device 102, such as the processor 104, a power source, and so forth. Alternatively or additionally, the hotspot 122 may correspond to a typical user contact region on the external surface 118, e.g., a portion of the rear surface 118b that a user typically touches when the user is holding and/or using the device 102. Thus, while in at least some embodiments other regions of the external surface 118 may occasionally be hotter than the hotspot 122, temperature of the hotspot 122 is monitored since a user may be in physical contact with the hotspot 122.

To enable the temperature of the hotspot 122 to be monitored, the touch temperature sensor 116 is positioned such that fluctuations in the temperature of the hotspot 122 are reflected in fluctuations in a temperature detected by the touch temperature sensor 116. For instance, there is a known relationship between fluctuations in the temperature of the hotspot 122 and fluctuations in a temperature detected by the touch temperature sensor 116. According to one or more embodiments, this relationship is mathematically quantifiable and predictable, such as a linear relationship and/or other relationship that can be leveraged to characterize correspondence between the temperature of the hotspot 122 and the temperature detected by the touch temperature sensor 116. Thus, even though the touch temperature sensor 116 may not be in direct physical contact with the hotspot 122, the touch temperature sensor 116 can be utilized to detect and control temperature of the hotspot 122 and/or other portions of the external surface 118.

As an example scenario, consider a handheld device implementation where a user is grasping the device 102 to view content displayed on the display 120. In grasping the device 102, the user's hands come in contact with various portions of the external surface 118, including the hotspot 122. To prevent the hotspot 122 from heating to a temperature that may cause discomfort and/or injury to the user, the temperature module 108 monitors the temperature of the touch temperature sensor 116. If the temperature detected by the touch temperature sensor 116 reaches a particular set limit that corresponds to a temperature limit for the hotspot 122, the temperature module 108 implements procedures to lower the temperature of the hotspot 122 and/or prevent the hotspot 122 from heating further.

For instance, the temperature module 108 can turn on the fans 106 and/or increase fan speed of the fans 106. The temperature module 108 may also throttle processing speed of the processor 104 to decrease heat output of the processor 104. Other resources may be throttled and/or shut down to decrease heat output of the device 102, and thus decrease further increase in temperature of the hotspot 122. If heat reduction procedures are not successful in reducing the temperature of the hotspot 122 and/or preventing further heating of the hotspot, the temperature module 108 can cause the device 102 to be put into a low power mode (e.g., hibernation) and/or shut down the device 102. This can prevent the user from being injured by excess heating of the hotspot, and may additionally prevent damage to components of the device 102.

In this example, the device 102 is discussed with reference to a single touch temperature sensor and a single hotspot. It is to be appreciated, however, that embodiments may utilize different forms and placements of touch temperature sensors, multiple touch temperature sensors (e.g., a temperature sensor array), and/or may consider multiple different hotspots or temperature sensitive regions of a device. Various other functionalities and implementation details concerning the different aspects of the environment 100 are discussed below.

Figure 2:
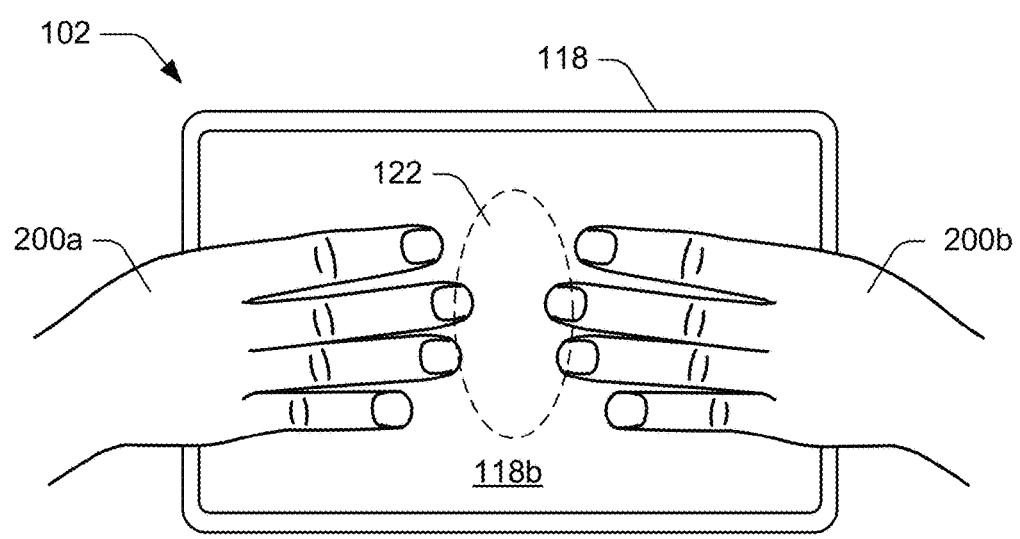
FIG. 2 illustrates an example implementation scenario in accordance with one or more embodiments.

FIG. 2 illustrates a rear view of the device 102 being grasped by a user. As illustrated, the user's hands 200a, 200b are grasping the rear surface 118b of the device 102. While grasping the device 102, the user's hands are in contact with and/or adjacent to the hotspot 122. Thus, it is apparent that monitoring and controlling the temperature of the hotspot 122 can prevent user discomfort and/or injury that may occur due to overheating of the hotspot 122 and/or other portions of the exterior surface 118 of the device 102. The temperature module 108 and the touch temperature sensor 116 introduced above, for example, track temperature of the hotspot 122 and enable various procedures to be employed to control temperature of the hotspot 122.

Having discussed an example environment in which embodiments for monitoring surface temperature of devices may be employed, consider now a discussion of remote temperature sensing in accordance with one or more embodiments.

Remote Temperature Sensing

According to various embodiments, surface temperature of a device may be sensed remotely, e.g., via a temperature sensor that is not directly sensing a temperature of the surface. For instance, with reference to the device 102 introduced above, the touch temperature sensor 116 can be considered remote from the hotspot 122 in that the touch temperature sensor 116 is not in direct contact with or directly sensing the temperature of the hotspot 122.

Sensing of surface temperature of a device using a remote temperature sensor can be implemented in various ways. For instance, a computer model of a device can be employed to generate a thermal profile of the device under various operating conditions. As an example implementation, consider the following procedure.

Figure 3:
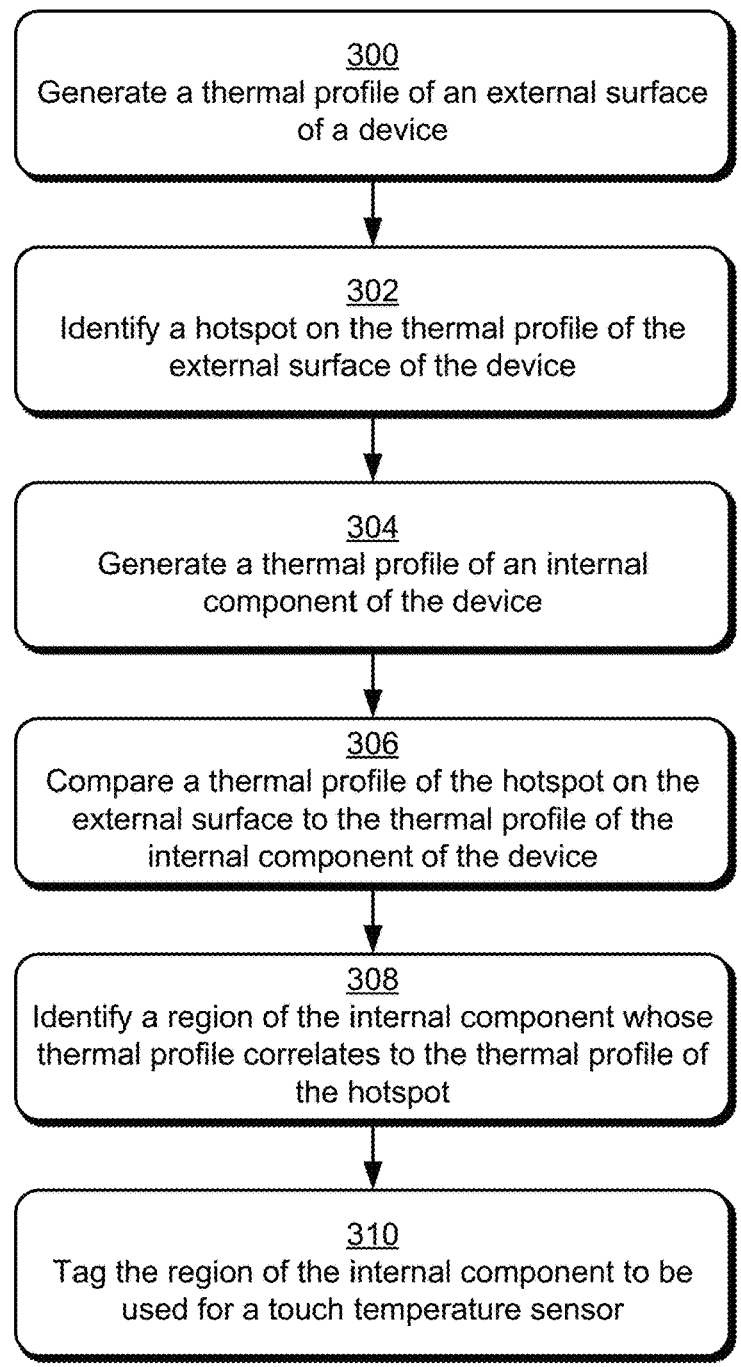
FIG. 3 is a flow diagram that describes steps in a method in accordance with one or more embodiments.

FIG. 3 is a flow diagram that describes steps in a method in accordance with one or more embodiments. Step 300 generates a thermal profile of an external surface of a device. The thermal profile, for instance, can be based on a 3-dimensional (3D) computer model of a device that simulates the device while in operation. Alternatively or additionally, the thermal profile may be generated utilizing thermal measurements of actual devices. The thermal profile generally characterizes temperatures at some or all points on a surface of a device in different operating states. The thermal profile considers various heat generating components of the device, such as processors, storage components, power sources, displays, and so forth. Thus, the thermal profile represents a computer-generated 3D heat mapping and/or an actual physical temperature measurements of the surface of the device. In at least some embodiments, the thermal profile of the external surface simulates a variety of different operating conditions, e.g., ambient temperatures, humidity levels, device (e.g., processor) loads, different types of computing tasks, and so forth.

As an example scenario, consider that the thermal profile characterizes temperatures at various regions on a surface of a modeled device starting with an initial power-on event. The thermal profile then tracks temperature changes at the various regions as the modeled device proceeds through different simulated operating scenarios. For instance, heating of the surface of the modeled device can be simulated under different operating scenarios, and the surface temperature characterized. Thus, the thermal profile can be leveraged to generate heating curves for different regions and points on the external surface of the device.

Step 302 identifies a hotspot on the thermal profile of the external surface of the device. The hotspot, for instance, corresponds to a point and/or region of the external surface that is hotter than other regions of the external surface.

Step 304 generates a thermal profile of an internal component of the device. For instance, a thermal profile of an internal PC board (e.g., the motherboard) of the device can be characterized. A computer model of the internal component can be generated, and the temperature of the modeled component can be characterized under different operating conditions. Alternatively or additionally, the thermal profile can be generated based on physical temperature measurements of a physical implementation of the internal component. In at least some embodiments, the thermal profile of the internal component simulates a variety of different operating conditions, e.g., ambient temperatures, humidity levels, device (e.g., processor) loads, different types of computing tasks, and so forth. The thermal profile of the internal component, for instance, can correspond to conditions under which the thermal profile of the external surface was generated. The thermal profile of the internal component can be leveraged to generate heating curves for different regions and points of the internal component.

Step 306 compares a thermal profile of the hotspot on the external surface to the thermal profile of the internal component of the device. For instance, a heating curve for the hotspot can be compared to heating curves for different regions of the internal components. The computer models for the external surface of the device and the internal component can be compared at different simulated operating times to determine temperature-related correlations between different regions of the internal component and the hotspot.

Step 308 identifies a region of the internal component whose thermal profile correlates to the thermal profile of the hotspot. For instance, a heating curve for a particular region of the internal component may have an identical or similar slope to that of the heating curve of the hotspot. Thus, the thermal profiles may not be identical, but may have a predictable heating relationship.

Step 310 tags the region of the internal component to be used for a touch temperature sensor. Thus, based on the computer simulation, a temperature sensor can be mounted on the actual hardware component to enable temperature of the hotspot to be tracked.

The above procedure describes a computer-implemented method for modeling various temperature profiles of a device and its surfaces and components to locate a region within the device for a touch temperature sensor. As referenced above, heat curves can be utilized to correlate temperatures for internal regions of a device with external surface temperatures of the device. For instance, consider the following graph.

Figure 4:
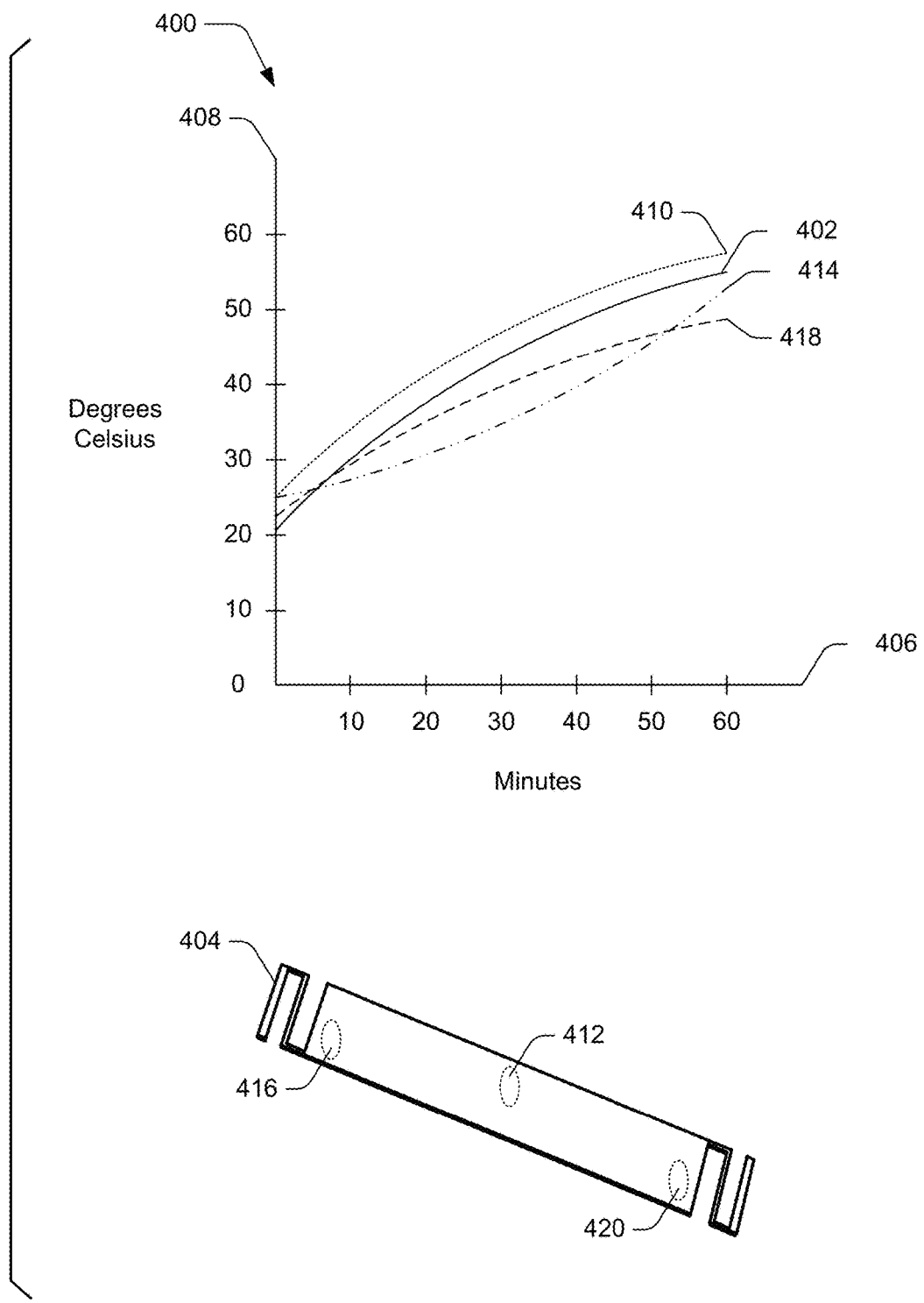
FIG. 4 illustrates an example implementation scenario in accordance with one or more embodiments.

FIG. 4 illustrates a heating graph 400 that illustrates a relationship between a hotspot heating curve 402 for a hotspot on a surface of a device and heating curves for regions of a PC board 404 of the device. The x-axis 406 of the heating graph 400 indicates time values in minutes, and the y-axis 408 indicates temperature values in degrees Celsius.

The hotspot heating curve 402 indicates temperatures detected at a particular region on a surface of a device over a particular period of time, e.g., 60 minutes. For instance, the hotspot heating curve 402 represents temperatures detected starting at a power-on event for the device and proceeding through different operating conditions of the device.

Several heating curves for different regions of the PC board 404 are also illustrated. For instance, a heating curve 410 corresponds to temperatures detected at a region 412 of the PC board 404. Further, a heating curve 414 corresponds to temperatures detected at a region 416 of the PC board 404. Still further, a heating curve 418 corresponds to temperatures detected at a region 420 of the PC board 404.

As illustrated, the heating curve 410 has the same or approximately the same slope as the hotspot heating curve 402. In at least some embodiments, this indicates that a heat profile of the region 412 changes at approximately the same rate as the hotspot associated with the hotspot heating curve 402. Although the temperatures detected at the hotspot and the region 412 may not be identical, a differential between the two locations may be constant or approximately constant over a range of different temperature changes. Thus, temperature at the region 412 provides a predicable indication (e.g., inference) of a temperature at the hotspot. For instance, a temperature at the hotspot may typically be a discrete number of degrees hotter or cooler than the temperature at the region 412. Accordingly, a temperature sensor can be mounted on the PC board 404 at the region 412 to track a temperature at the hotspot on the external surface of the device.

The PC board 404 and the associated regions 412, 416, 420 are presented for purpose of illustration only, and it is to be appreciated that embodiments may employ any suitable internal component and portion(s) of an internal component within the spirit and scope of the claimed embodiments. Further, embodiments may employ different types of relationships between a temperature on an external surface of a device and a temperature on a region of an internal component of the device. Examples of such relationships include a linear relationship, a quadratic relationship, an inverse relationship, and so forth.

Direct Temperature Sensing

According to various embodiments, surface temperature of a device may be directly detected, e.g., via a temperature sensor that positioned to directly sense a temperature of one or more portions of the surface. For instance, consider the following example implementation.

Figure 5:
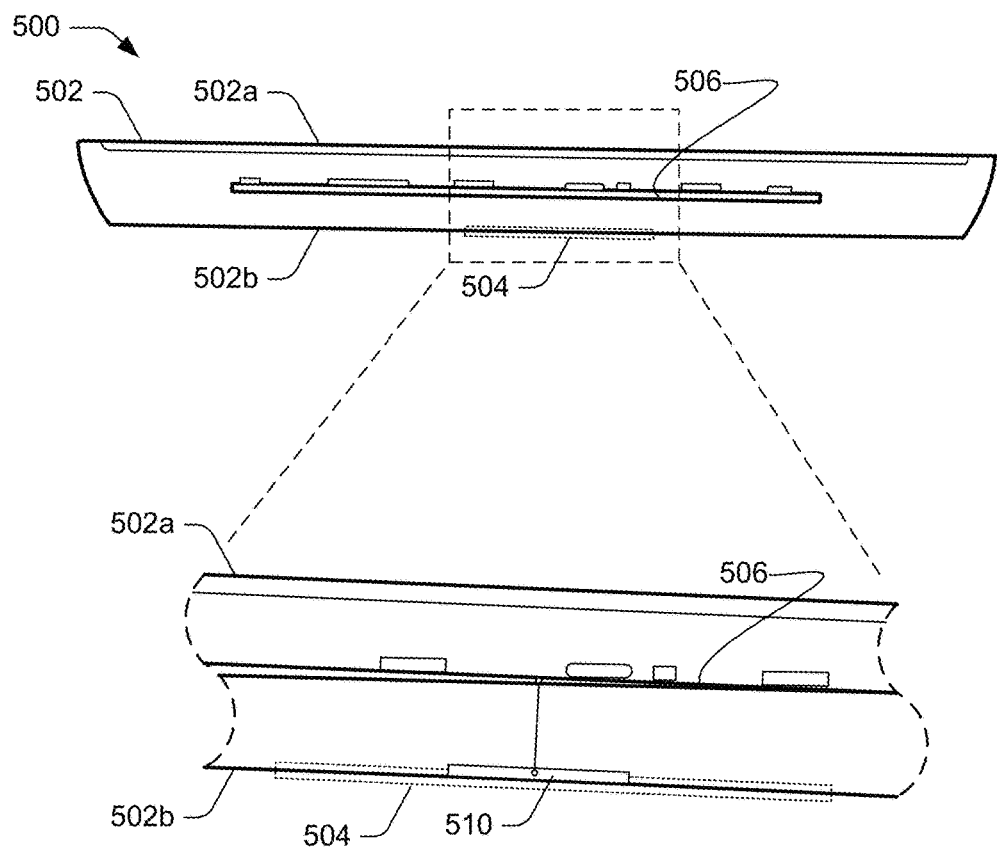
FIG. 5 illustrates an example implementation scenario in accordance with one or more embodiments.

FIG. 5 illustrates a side cutaway view of a device 500. The device 500 includes an external surface 502 with a front surface 502a and a rear surface 502b. The rear surface includes a hotspot 504 which generally corresponds to a region of the external surface 502 is typically hotter than other regions of the external surface. Alternatively and/or additionally, the hotspot 504 corresponds to a region of the external surface 502 that is typically in contact with a user during common usage scenarios.

The device 500 further includes a PC board 506 which is mounted internally to the device 500 and on which various components of the device 500 are mounted. The PC board 506, for example, represents a motherboard for the device 500.

FIG. 5 further illustrates an enlarged section view 508 of a portion of the device 500. The section view 508 includes a portion of the front surface 502a and a portion of the rear surface 502b with the hotspot 504. Attached to the internal portion of the rear surface 502b and at the hotspot 504 is a temperature sensor 510. The temperature sensor 510 is connected to one or more components of the PC board 506. For instance, the temperature sensor 510 can be configured to provide temperature information for the hotspot 504 to a temperature control functionality, such as the temperature module 108 introduced above with reference to the environment 100. The temperature sensor 510 can be configured in a variety of different ways, such as a thin film temperature sensor attached to the internal portion of the rear surface 502b at the hotspot 504. However, a variety of other types and implementations of temperature sensors may be employed.

Accordingly, the temperature sensor 510 detects the temperature directly at the hotspot 504, and thus enables various techniques discussed herein to be employed to control the temperature of the hotspot 504. For instance, if the temperature of the hotspot 504 reaches or exceeds a threshold temperature, preventive measures can be taken in an attempt to reduce the temperature of the hotspot 504 and/or prevent further heating of the hotspot 504. Thus, embodiments may directly detect the temperature of an external surface of a device via a temperature sensor attached at and/or adjacent to a portion of the external surface. Temperature of an external surface may be directly detected in other ways, however. For instance, consider the following example implementation.

Figure 6:
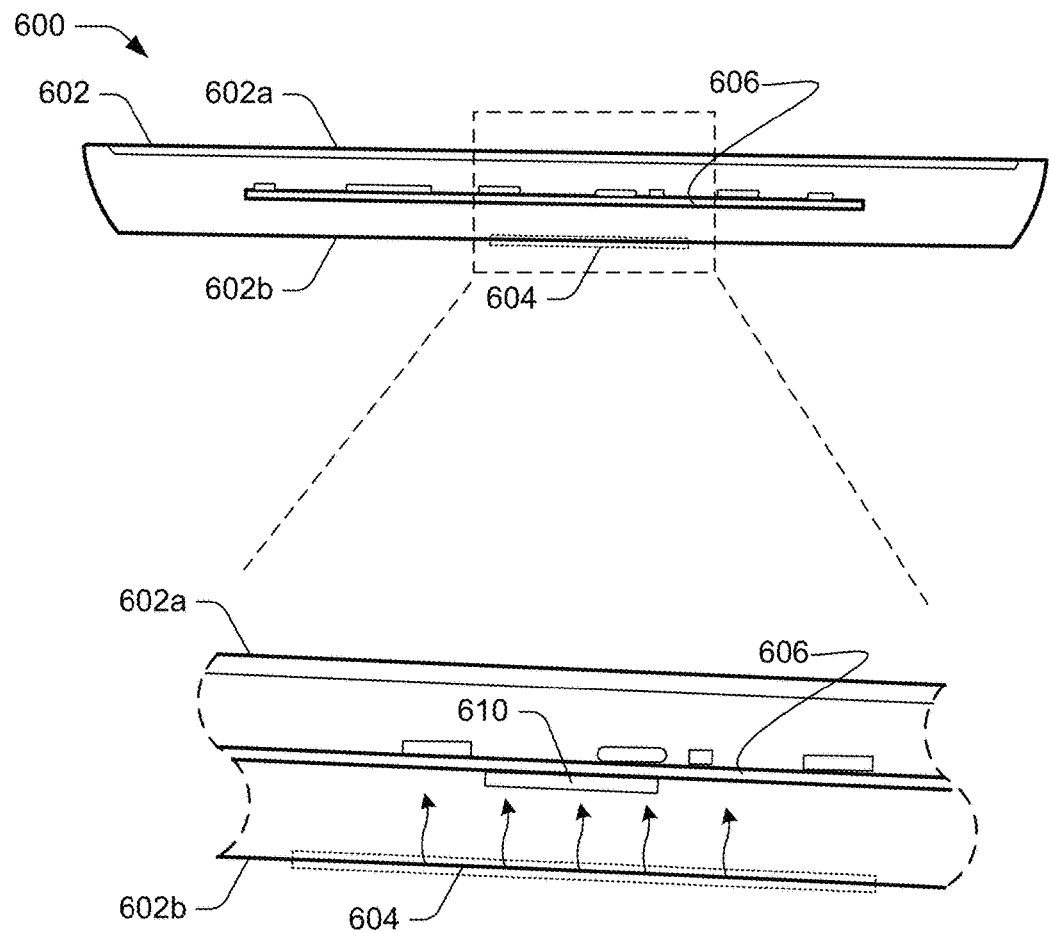
FIG. 6 illustrates an example implementation scenario in accordance with one or more embodiments.

FIG. 6 illustrates a side cutaway view of a device 600. The device 600 includes an external surface 602 with a front surface 602a and a rear surface 602b. The rear surface includes a hotspot 604.

The device 600 further includes a PC board 606 which is mounted internally to the device 600 and on which various components of the device 600 are mounted. The PC board 606, for example, represents a motherboard for the device 600.

FIG. 6 further illustrates an enlarged section view 608 of a portion of the device 600. The section view 608 includes a portion of the front surface 602a and a portion of the rear surface 602b with the hotspot 604. Attached to the PC board 606 is a temperature sensor 610 which is positioned to detect heat that is radiated from the hotspot 604. The temperature sensor 610, for example, can be configured as an infrared (IR) sensor that is positioned to detect infrared radiation from the hotspot 604. Based on the infrared radiation emitted from the hotspot 604, the temperature sensor 610 can detect a temperature of the hotspot 604. Additionally or alternatively, the temperature sensor 610 may be configured to detect other types of thermal and/or light-induced radiation from the hotspot 604 to detect a temperature of the hotspot 604. Thus, even though the temperature sensor 610 is not in direct contact with the hotspot 604, the temperature sensor 610 can nonetheless directly detect a temperature of the hotspot 604.

The temperature sensor 610 is connected to one or more components of the PC board 606. For instance, the temperature sensor 610 can be configured to provide temperature information for the hotspot 604 to a temperature control functionality, such as the temperature module 108 introduced above with reference to the environment 100.

Accordingly, the temperature sensor 610 detects temperature directly from the hotspot 604, and thus enables various techniques discussed herein to be employed to control the temperature of the hotspot 604. For instance, if the temperature of the hotspot 604 reaches or exceeds a threshold temperature, preventive measures can be taken in an attempt to reduce the temperature of the hotspot 604 and/or prevent further heating of the hotspot 604. Thus, embodiments may directly detect the temperature of an external surface of a device via a temperature sensor that is positioned away from the external surface but that detects heat radiated from the external surface.

Having discussed some example implementations for temperature detection, consider now a discussion of some example procedures in accordance with one or more embodiments.

Example Procedures

The following discussion describes some example procedures for monitoring surface temperature of devices in accordance with one or more embodiments. The example procedures may be employed in the environment 100 of FIG. 1, the system 900 of FIG. 9, and/or any other suitable environment. In at least some embodiments, the steps described for the various procedures can be implemented automatically and independent of user interaction.

Figure 7:
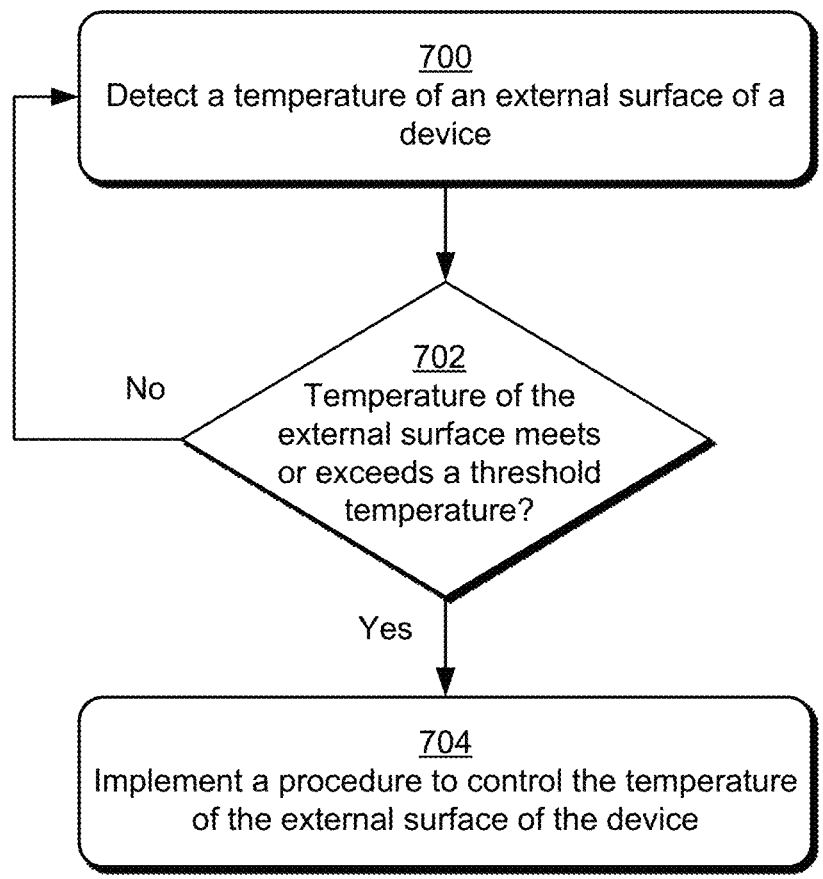
FIG. 7 is a flow diagram that describes steps in a method in accordance with one or more embodiments.

FIG. 7 is a flow diagram that describes steps in a method in accordance with one or more embodiments. Step 700 detects a temperature of an external surface of a device. The temperature can be detected in a variety of ways, such as via a temperature sensor infers a temperature of the external surface via a temperature detected at a location remote from the external surface. Alternatively or additionally, the temperature of the external surface can be detected via a temperature sensor that directly detects the temperature of the external surface. Example implementations for remote and direct detection of surface temperature are discussed above.

Step 702 determines whether the temperature of the external surface meets or exceeds a threshold temperature. In a remote temperature detection scenario, a threshold temperature of an external surface can be inferred from a threshold temperature detected at a location remote from the external surface. As discussed above, for example, an internal location of a device can be identified whose heating profile has a corresponding relationship with a heating profile on an external surface, e.g., a hotspot on the external surface. Thus, the temperature at the internal location may not be identical to the temperature on the external surface at a particular time. However, a difference between the temperature at the internal location and the temperature of the external surface may be known. Additionally or alternatively, the rate at which the temperature at the internal location increases or decreases may correspond to the rate at which the temperature at the external surface increases or decreases. Thus, fluctuations in temperature at the internal location may have a known and predictable relationship to fluctuations in temperature at the external surface.

For instance, consider that a threshold temperature of 42° C. is specified for a hotspot of an external surface of a device. An internal region of the device that is identified according to techniques discussed herein to track the temperature of the hotspot is determined to be at approximately 52° C. when the hotspot is at 42° C. The internal region, for instance, may typically run about 10° hotter than the hotspot. Thus, a temperature threshold of 52° C. is specified for a temperature sensor placed at the identified internal region.

In a direct temperature sensing scenario, whether or not the temperature of an external surface of a device has reached or exceeded a threshold temperature can be directly detected from the external surface.

If the temperature of the external surface does not meet or exceed the threshold temperature ("No"), the method returns to step 700. If the temperature of the external surface meets or exceeds the threshold temperature ("Yes"), step 704 implements a procedure to control the temperature of the external surface of the device.

Various types of procedures can be employed to control the temperature of a device and thus a temperature of an external surface of the device. For instance, consider the following example procedure.

Figure 8:
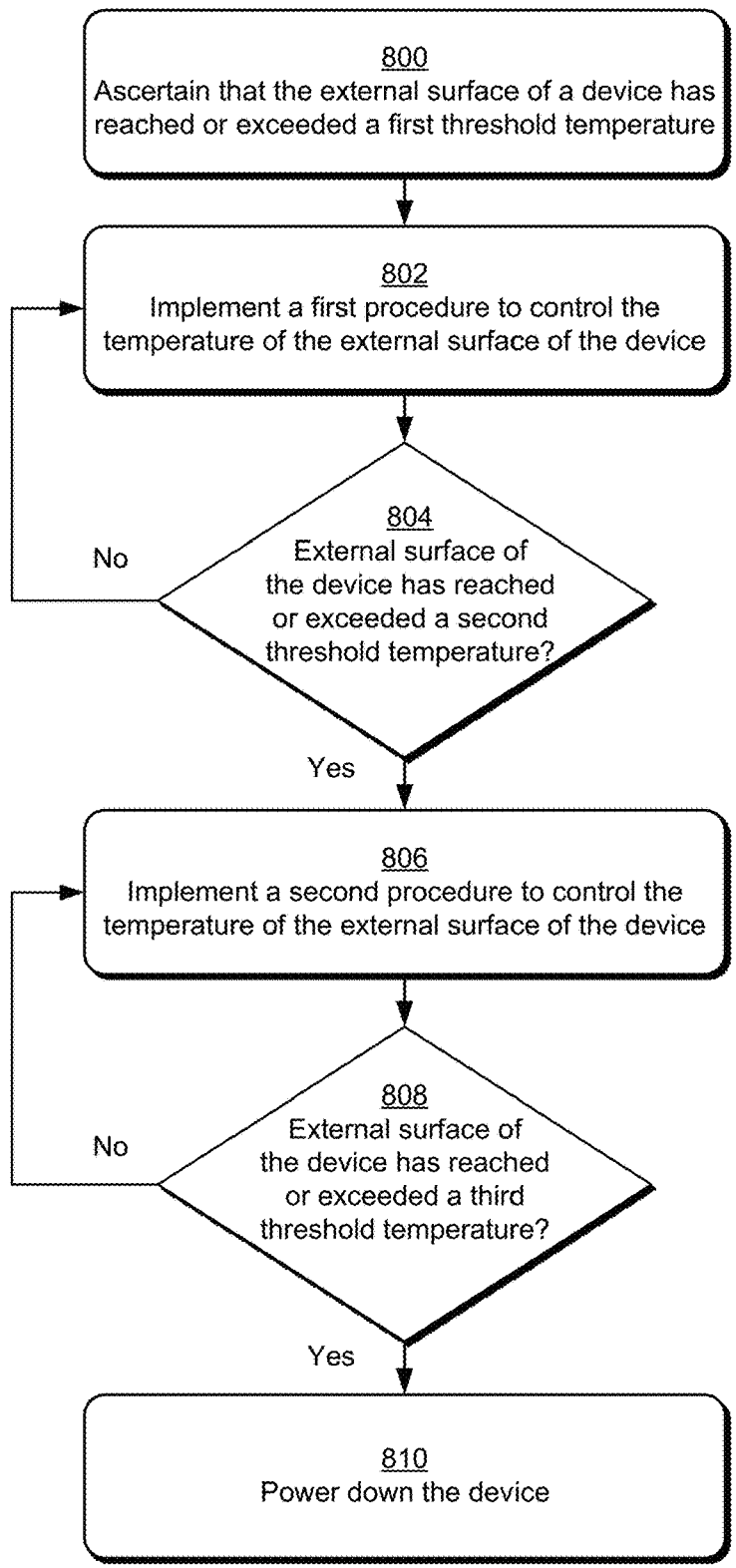
FIG. 8 is a flow diagram that describes steps in a method in accordance with one or more embodiments.

FIG. 8 is a flow diagram that describes steps in a method in accordance with one or more embodiments. Step 800 ascertains that the external surface of a device has reached a first threshold temperature. Different ways of detecting temperature of an external surface of the device are detailed above.

Step 802 implements a first procedure to control the temperature of the external surface of the device. For instance, one or more fans of the device can be turned on or if already running, can be turned up in speed. Alternatively or additionally, processor performance can be throttled to reduce processor heat output. Thus, various types and combinations of heat control procedures can be employed as part of the first procedure.

Step 804 determines whether the external surface of the device has reached or exceeded a second threshold temperature. The second threshold temperature, for example, may be several degrees hotter than the first threshold temperature e.g., 4° or 5° hotter.

If the external surface of the device has not reached or exceeded the second threshold temperature ("No"), the method returns to step 802. In at least some embodiments, if the external surface of the temperature falls below the first threshold temperature, the first procedure to control the temperature of the external surface of the device can be scaled back or terminated.

If the external surface of the device has reached or exceeded the second threshold temperature ("Yes"), step 806 implements a second procedure to control the temperature of the external surface of the device. For instance, the device's fan speed can be further increased, and/or processor throttling can be implemented. Thus, various types and combinations of heat control procedures can be employed as part of the second procedure.

Step 808 determines whether the external surface of the device has reached or exceeded a third threshold temperature. The third threshold temperature, for example, may be several degrees hotter than the second threshold temperature.

If the external surface of the device has not reached or exceeded the third threshold temperature ("No"), the method returns to one or more of step 802, 806, or may terminate if the external surface of the device falls below the first threshold temperature.

If the external surface of the device has reached or exceeded the third threshold temperature ("Yes"), step 810 powers down the device. For instance, the device can be automatically shut down in response to reaching or exceeding the $3^{rd}$ threshold temperature. This can prevent the external surface of the device from further heating to a dangerous temperature and/or damage to internal components of the device.

These temperature control procedures are presented for purpose of example only, and it is to be appreciated that embodiments may employ other types and combinations of temperature control procedures. Further, it is to be appreciated that techniques for monitoring surface temperature of devices discussed herein may be implemented concurrently with and/or in addition to techniques for controlling an internal temperature of various components of a device, such as to protect the internal components from heat-related damage.

Having discussed some example procedures, consider now a discussion of an example system and device in accordance with one or more embodiments.

Example System and Device

Figure 9:
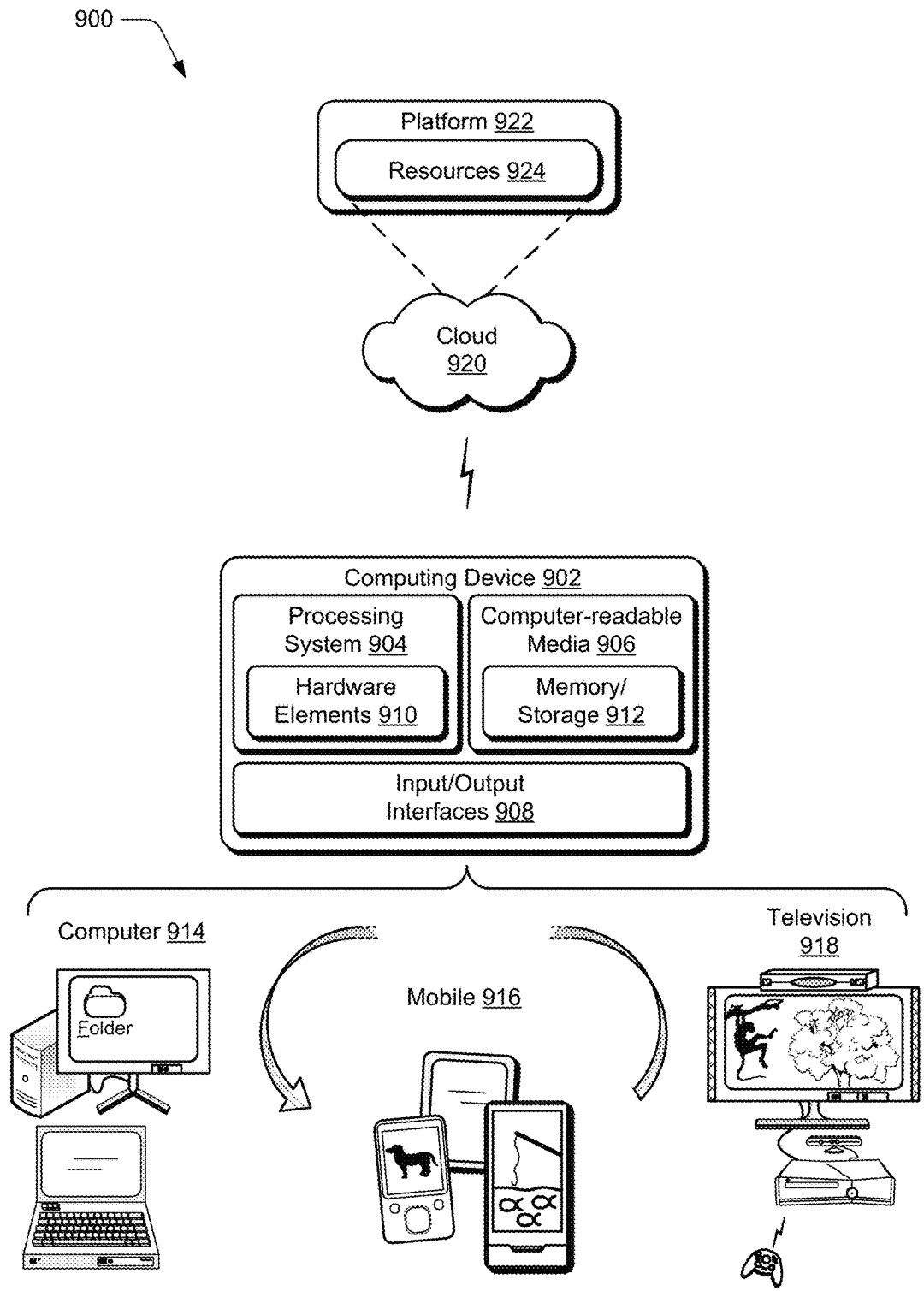
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, techniques discussed herein for monitoring surface temperature of devices may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for monitoring surface temperature of devices are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computing device comprising:
a chassis with an external surface and an internal component;
an internal temperature sensor positioned to sense a temperature of the internal component; and
a circuit configured to:
receive, via the internal temperature sensor, a detected temperature of the internal component;
determine an inferred temperature of the external surface based at least on the detected temperature of the internal component;
determine whether the inferred temperature of the external surface meets or exceeds a threshold temperature; and
in an event that the inferred temperature of the external surface meets or exceeds the threshold temperature, implement a procedure to control a subsequent temperature of the external surface,
wherein the inferred temperature is determined based at least on one or more thermal profiles, the one or more thermal profiles relating measured temperatures of the internal component to measured temperatures of the external surface as measured under different operating conditions.

2. The computing device as recited in claim 1, wherein the internal component is an internal printed circuit board.

3. The computing device as recited in claim 1, wherein the internal temperature sensor is positioned to sense a particular region of the external component and the inferred temperature relates to a particular region of the external surface that is a known hotspot.

4. The computing device as recited in claim 1, wherein the internal temperature sensor is mounted on the internal component.

5. The computing device as recited in claim 1, wherein the circuit comprises a processor configured via instructions stored on one or more computer-readable storage media.

6. The computing device as recited in claim 1, wherein the circuit comprises an application-specific integrated circuit.

7. The computing device as recited in claim 1, wherein the internal temperature sensor comprises an infrared (IR) temperature sensor.

8. The computing device as recited in claim 1, wherein the internal component comprises a motherboard for the computing device, and the internal temperature sensor is mounted on the motherboard.

9. The computing device as recited in claim 1, wherein the procedure comprises turning on a fan of the computing device.

10. The computing device as recited in claim 9, wherein the procedure comprises throttling a processor of the computing device.

11. A computer-implemented method, comprising:
detecting a current interior temperature of a computing device;
inferring a temperature of a user contact region on an external surface of the computing device based at least on one or more thermal profiles relating measured interior temperatures to measured external temperatures of the user contact region as measured under different operating conditions;
determining whether the inferred temperature of the user contact region meets or exceeds a threshold temperature; and
in an event that the inferred temperature of the user contact region meets or exceeds the threshold temperature, implementing a procedure to control a subsequent temperature of the user contact region of the computing device.

12. The method as described in claim 11, wherein the different operating conditions relate to a processor load of a processor of the computing device.

13. The method as described in claim 12, further comprising:
detecting the current interior temperature using a temperature sensor positioned at a particular region on an internal component of the computing device, the one or more thermal profiles indicating that, under the different operating conditions, the particular region on the internal component has a constant or approximately constant temperature differential relative to the user contact region.

14. The method as described in claim 12, wherein the implementing the procedure to control the subsequent temperature comprises throttling the processor.

15. A system comprising:
a chassis with an external surface and one or more internal components;
a temperature sensor positioned to detect an internal temperature that corresponds to an external temperature of a user contact region on the external surface, the user contact region being identified as a portion of the external surface that a user is typically in physical contact with when interacting with the system; and
a circuit configured to:
infer the external temperature of the user contact region of the chassis based at least on the internal temperature and a relationship between a thermal profile of an interior portion of the chassis and another thermal profile of the user contact region, the relationship being based at least on a heating curve of the interior portion and another heating curve of the user contact region;
determine whether the external temperature of the user contact region meets or exceeds a threshold temperature; and
in an event that the external temperature of the user contact region meets or exceeds the threshold temperature, implement a procedure to control the external temperature.

16. The system as recited in claim 15, wherein the interior portion comprises a particular region of an individual internal component, and the particular region of the individual internal component has a specified thermal relationship with the user contact region of the external surface.

17. The system as recited in claim 16, wherein the relationship indicates that the particular region of the individual internal component has a constant or approximately constant temperature differential relative to the user contact region.

18. The system as recited in claim 16, wherein the another thermal profile of the user contact region is based at least on a computer simulation of an operating scenario of the system.

19. The system as recited in claim 16, wherein the temperature sensor is positioned on the particular region of the individual internal component.

20. The system as recited in claim 19, wherein the circuit comprises an application-specific integrated circuit.

* * * * *